United States Patent
Thomas et al.

(10) Patent No.: US 9,236,690 B2
(45) Date of Patent: Jan. 12, 2016

(54) DEVICE FOR A PATCH PANEL

(75) Inventors: David Thomas, Upton (GB); David John Chirgwin, Vicars Cross (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/111,868

(22) PCT Filed: Apr. 11, 2012

(86) PCT No.: PCT/EP2012/056491
§ 371 (c)(1),
(2), (4) Date: Oct. 15, 2013

(87) PCT Pub. No.: WO2012/140026
PCT Pub. Date: Oct. 18, 2012

(65) Prior Publication Data
US 2014/0038436 A1    Feb. 6, 2014

(30) Foreign Application Priority Data
Apr. 14, 2011    (GB) .................................. 1106318.7

(51) Int. Cl.
*H01R 13/66* (2006.01)
*H04M 3/22* (2006.01)
(Continued)

(52) U.S. Cl.
CPC ............. *H01R 13/6691* (2013.01); *H04M 3/22* (2013.01); *H04Q 1/00* (2013.01); *H04Q 1/136* (2013.01); *H01R 12/712* (2013.01); *H01R 12/716* (2013.01); *H01R 13/514* (2013.01); *H01R 13/518* (2013.01); *H01R 13/641* (2013.01); *H01R 13/65802* (2013.01); *H01R 13/6658* (2013.01); *H01R 23/6873* (2013.01)

(58) Field of Classification Search
CPC ............. H01R 12/716; H01R 13/6658; H01R 13/514; H01R 13/518; H01R 23/6873; H01R 13/65802; H01R 12/712; H01R 13/641; H01R 2201/04; H01R 24/64
USPC ............................ 439/540.1, 489, 490, 541.5
See application file for complete search history.

(56) References Cited

U.S. PATENT DOCUMENTS

| 7,160,143 B2 | 1/2007 | David et al. |
| 7,370,106 B2 * | 5/2008 | Caveney ....................... 709/224 |

(Continued)

FOREIGN PATENT DOCUMENTS

| EP | 1 771 015 | 4/2007 |
| WO | WO 2010/042586 | 4/2010 |

OTHER PUBLICATIONS

International Search Report for International Application No. PCT/EP2012/056491 mailed Jun. 29, 2012.

*Primary Examiner* — Abdullah Riyami
*Assistant Examiner* — Justin Kratt
(74) *Attorney, Agent, or Firm* — Merchant & Gould P.C.

(57) ABSTRACT

A pluggable modular device is configured for removable connection to a patch panel. The pluggable modular device includes an electrical connector for mating with a corresponding electrical connector of the patch panel; and at least one of scanning electronics for scanning connection ports of the patch panel and guidance electronics for activating indicators of the patch panel.

9 Claims, 2 Drawing Sheets

(51) Int. Cl.
*H04Q 1/00* (2006.01)
*H04Q 1/02* (2006.01)
*H01R 12/71* (2011.01)
*H01R 13/658* (2011.01)
*H01R 13/518* (2006.01)
*H01R 13/641* (2006.01)
*H01R 13/514* (2006.01)
*H01R 12/50* (2011.01)

(56) References Cited

U.S. PATENT DOCUMENTS

2005/0078009 A1* 4/2005 Shalts et al. .................. 340/635
2007/0174528 A1 7/2007 Mantver
2010/0176962 A1* 7/2010 Yossef ..................... 340/815.45

* cited by examiner

DEVICE FOR A PATCH PANEL

This application is a National Stage Application of PCT/EP2012/056491, filed 11 Apr. 2012, which claims benefit of Serial No. 1106318.7, filed 14 Apr. 2011 in Great Britain and which applications are incorporated herein by reference. To the extent appropriate, a claim of priority is made to each of the above disclosed applications.

BACKGROUND

The present invention relates to a device for a patch panel, and in particular to a device for at least one of scanning connection ports of the patch panel and activating indicators of the patch panel.

Patch panels are commonly employed in computing networks for interfacing with patch cables, the patch cables carrying data from one location to another. In some applications, for example in large data-centres, the numbers of patch cables and corresponding patch panels can become very large and difficult to maintain and manage.

A known system for managing a large network of patch cable connections comprises a patch panel with scanning electronics, the scanning electronics for determining which of the patch panel's sockets have patch cables plugged into them. The scanning electronics may have a communication interface for feeding the information on the connections back to a computer. For an example, refer to U.S. Pat. No. 7,160,143.

A further known system for managing a large network of patch cable connections comprises a patch panel with guidance electronics for guiding a technician working on the patch panel connections. The guidance electronics may comprise lamps that light up above particular patch panel sockets to indicate which sockets various patch cables are to be inserted/removed. The control information for the guidance electronics may be received via a communication interface to a computer. Such guidance functions are implemented in, for example, the PatchView IIM products available from RiT Technologies Ltd.

One of the drawbacks of such scanning electronics and guidance electronics is that it typically reduces the expected lifetime of the patch panel, since it can be more vulnerable to failure than the remaining electrical/physical elements of the patch panel.

One method of addressing this problem is to integrate the scanning and guidance electronics into a central analyser unit, and to route at least one conductor from each patch panel socket back to the central analyser unit. However, this results in a large number of conductors to be routed from the patch panels and plugged into the analyser unit, and if one part of the scanning or guidance electronics in the analyser fails, then typically the whole analyser needs to be replaced.

The replacement of the patch panels and the analyser unit can also result in significant difficulties in ensuring that the patch cables that are removed from the old patch panel/analyser are all placed into the correct sockets of the replacement patch panel/analyser.

SUMMARY

It is therefore an aim of the invention to improve upon known patch panel scanning and/or guidance systems.

According to an aspect of the invention, there is provided a pluggable modular device for removable connection to a patch panel, the pluggable modular device comprising:

an electrical connector for mating with a corresponding electrical connector of the patch panel; and at least one of scanning electronics for scanning connection ports of the patch panel and guidance electronics for activating indicators of the patch panel.

The use of a pluggable modular device which can be plugged in or out of various patch panels to provide scanning and/or guidance functions means that the failure of the scanning or guidance electronics does not require the removal and replacement of a large number of cables. The pluggable modular device can simply be plugged out of the patch panel and replaced with another replacement pluggable modular device.

The scanning functionality typically comprises scanning the connection ports of the patch panel to determine which connection ports have patch cables connected to them, and the guidance functionality typically comprises activating various indicators of the patch panel to indicate to a technician which connection ports should have patch cables connected/disconnected from them.

Advantageously, the pluggable modular device may comprise an output connector for sending the scan results to an evaluation unit, and/or for receiving guidance information from the evaluation unit.

Furthermore, the output connector of the pluggable modular device may carry power to the pluggable modular device to avoid loading the power source(s) available at the patch panels. The connector may comprise conductors for carrying serial data, thereby reducing the number of conductors that are required between the pluggable modular device and the evaluation unit. The reduced number of conductors may enable a larger number of pluggable modular devices to be connected into the evaluation unit.

Alternate connection methods for carrying data between the pluggable modular device and a central computer may also be envisaged, for example using wireless technologies.

According to a second aspect of the invention, there is provided a cable management system comprising at least two of the pluggable modular devices of the first aspect and respective patch panels connected to the pluggable modules by the electrical connectors.

The cable management system may further comprise an evaluation unit having a plurality of connectors, each connector electrically connected to the output connector of a respective pluggable modular device via a serial cable.

Advantageously, the evaluation unit may receive scan results from the pluggable modular devices and/or send guidance information to the pluggable modular devices. The evaluation unit may maintain a log of the connections present in the network and act as a central point for managing the network. Alternatively, the evaluation unit may simply collate the scan results and then forward them to a computer, and/or receive guidance information from a computer and distribute it to the appropriate pluggable modules.

BRIEF DESCRIPTION OF THE DRAWINGS

Embodiments of the invention will now be described with reference to the accompanying drawings, in which.

DETAILED DESCRIPTION

Figure 1:
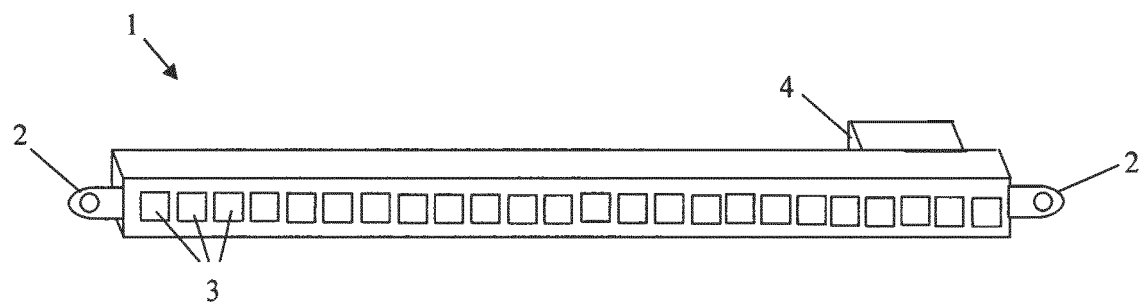
FIG. 1 shows a schematic perspective diagram of a known patch panel.

FIG. 1 shows a schematic diagram of a known patch panel 1 as may be used in a cable management system. The patch panel 1 has two mounting brackets 2 for mounting to a frame, and has twenty-four RJ45 connectors 3 for connecting to patch cables. The patch panel further comprises a socket 4 comprising at least twenty-four sense conductors that are routed from respective ones of the twenty-four connectors 3. The socket 4 is connected via a cable to a central analyser unit (not shown in Figs). The central analyser unit comprises scanning electronics that scans each one of the RJ45 connectors 3 via the socket 4 to determine which of the RJ45 connectors 3 have patch cables connected to them.

The central analyser unit is also connected to other similar cables from other similar patch panels, and maintains a database (or is connected to another computing device that maintains a database based on information from the central analyser unit) of the connection statuses of the connectors of all the patch panels.

The socket 4 may also include a further set of conductors connected to twenty-four respective LED lamps (hereinafter "LEDs) adjacent respective ones of the connectors 3. The LEDs may be driven by the central analyser unit to indicate to a technician which connectors 3 are to have cables plugged or unplugged from them.

Figure 2:
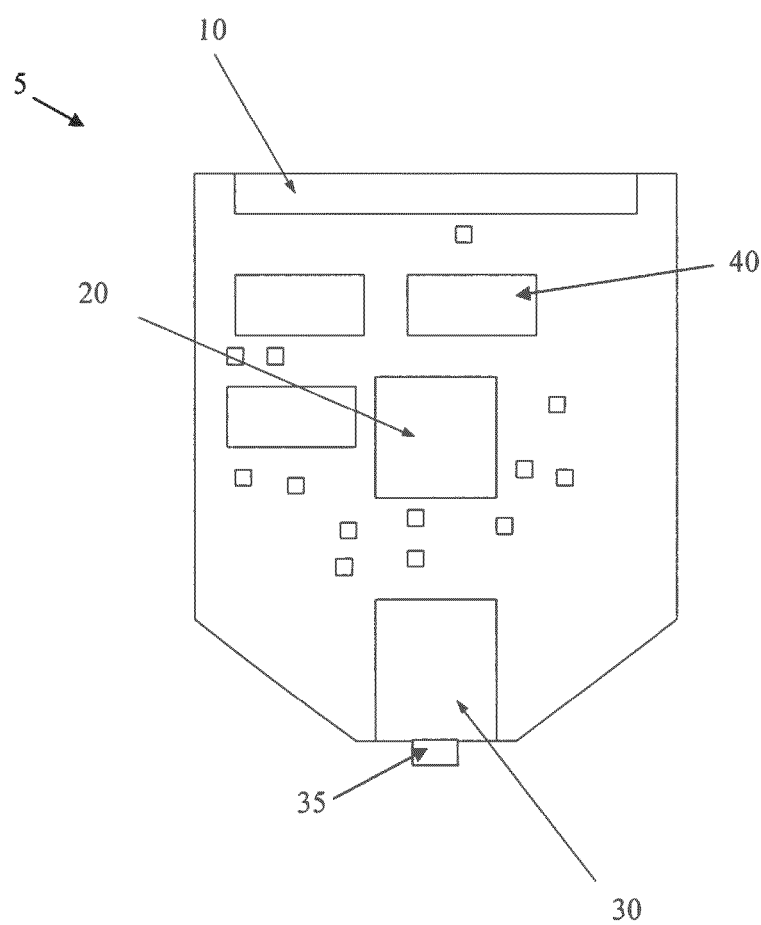
FIG. 2 shows a schematic diagram of a pluggable modular device according to an embodiment of the invention for connecting to the patch panel of FIG. 1.

FIG. 2 shows a diagram of a pluggable modular device 5 according to an embodiment of the invention. The pluggable modular device 5 comprises an electrical connector 10 for mating with the twenty-four sense conductors of the socket 4 of the patch panel of FIG. 1. The pluggable modular device 5 comprises scanning electronics 20 for determining which connectors 3 have patch panels connected to them. The scanning electronics 20 may be similar to the scanning electronics in known central analyser units, and checks each one of the sense conductors from the sockets 4 to produce a set of results specifying which sockets have patch cables connected to them and which do not.

The pluggable modular device 5 further comprises a transceiver 30 for transmitting serial data on the scan results from the scanning electronics via an RJ45 connector 35. The pluggable modulular device 5 also comprises guidance electronics including LED drivers 40 for driving the twenty-four LEDs associated with the twenty-four respective connectors 3 of the patch panel. The transceiver 3 receives guidance information via the connector 35 specifying which LEDs should be lit, and the guidance electronics uses the information to light the required LEDs.

In this embodiment, the pluggable module includes both scanning and guidance electronics, although in alternate embodiments only one of these two possibilities may be implemented.

Figure 3:
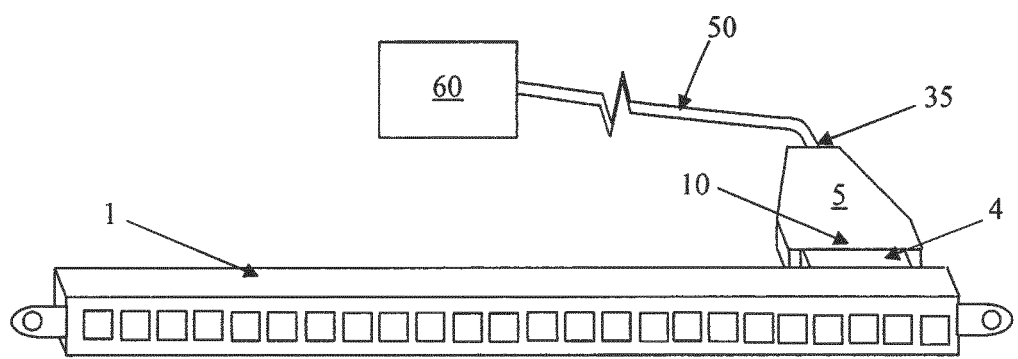
FIG. 3 shows a schematic diagram of the pluggable modular device of FIG. 2 when plugged into the patch panel 9 of FIG. 1 and sending scan results to an evaluation unit.

The schematic diagram of FIG. 3 shows the pluggable modular device 5 when attached to the patch panel 1 by mating the connector 10 with the socket 4. A serial cable 50 is connected from the RJ45 connector 35 of the pluggable modular device 5 to a central evaluation unit 60. The serial cable carries at least one of scan results and guidance information between the pluggable modular device 5 and the evaluation unit 60, and may further provide a power supply for powering the pluggable modular device 5 from the evaluation unit 60. The evaluation unit 60 may also receive serial cables from further pluggable modules and associated patch panels.

The evaluation unit 60 is similar to known analyser units, but it does not have to include scanning and/or guidance electronics as these are now present in the pluggable module. Furthermore, the evaluation unit only requires a serial RJ45 connector to service a whole patch panel with twenty-four sockets, instead of a much larger connector having at least twenty-four conductors for directly connecting to the sense conductors of the patch panel.

Upon failure of the scanning and/or guidance electronics of a pluggable modular device, the pluggable modular device can be simply replaced by another pluggable modular device, without having to disconnect and reconnect large numbers of cables.

Many other embodiments falling within the scope of the appended claims will also be apparent to those skilled in the art.

The invention claimed is:

1. A cable management system comprising:
a patch panel defining a plurality of connectors and a socket, the patch panel also including a plurality of sense conductors, each sense conductor connecting one of the connectors to the socket; and
a pluggable modular device including a first connector and a second connector, the first connector being plugged into the socket, the second connector being accessible when the first connector is plugged into the socket, the pluggable modular device including scanning electronics and a transceiver for sending data obtained by the scanning electronics to the second connector.

2. The cable management system of claim 1, further comprising a data cable that electrically connects to the second connector of the pluggable modular device.

3. The cable management system of claim 2, further comprising a central evaluation unit that electrically connects to the data cable.

4. The cable management system of claim 3, wherein the central evaluation unit does not include scanning electronics.

5. The cable management system of claim 1, wherein the patch panel includes a respective LED lamp corresponding to each connector, and the pluggable modular device includes guidance electronics.

6. The cable management system of claim 5, further comprising a data cable that electrically connects to the second connector of the pluggable modular device.

7. The cable management system of claim 6, further comprising a central evaluation unit that electrically connects to the data cable.

8. The cable management system of claim 7, wherein the central evaluation unit does not include scanning electronics.

9. The cable management system of claim 5, wherein upon failure of the scanning electronics and/or guidance electronics, the pluggable modular device can be replaced by another pluggable modular device without having to disconnect and reconnect a large number of cables.

* * * * *